United States Patent [19]

Kaiser et al.

[11] Patent Number: 5,561,059
[45] Date of Patent: Oct. 1, 1996

[54] SUBSTRATE BIOAVAILABILITY ENHANCING CHEMICAL MIXTURE FOR USE IN BIOREMEDIATION

[76] Inventors: Conard E. Kaiser, 10220 Memorial Dr. #67, Houston, Tex. 77024; Jock R. Collins, 7627 Skyline, Houston, Tex. 77063

[21] Appl. No.: 460,517

[22] Filed: Jun. 2, 1995

Related U.S. Application Data

[63] Continuation of Ser. No. 18,747, Feb. 17, 1993, abandoned.

[51] Int. Cl.$^6$ ............... C12N 1/38; B09B 3/00; C07G 17/00
[52] U.S. Cl. ............ 435/101; 435/244; 435/262; 435/262.5; 435/267; 435/801; 435/821
[58] Field of Search ............... 435/101, 244, 435/262.5, 267, 801, 821

[56] References Cited

U.S. PATENT DOCUMENTS

| | | | |
|---|---|---|---|
| 3,767,527 | 10/1973 | Coty et al. | 435/262 |
| 3,779,866 | 12/1973 | Azarowicz | 435/262 |
| 4,276,094 | 6/1981 | Gutnick et al. | 134/10 |
| 4,297,122 | 10/1981 | Wallace | 435/262 |
| 5,024,780 | 6/1991 | Leys | 252/162 |

OTHER PUBLICATIONS

Schenk et al (Abstract) Chem Abstract 109(12):946349 (1988).

*Primary Examiner*—John Kight
*Assistant Examiner*—Louise Leary
*Attorney, Agent, or Firm*—Fulbright & Jaworski L.L.P.

[57] ABSTRACT

A substrate bioavailability enhancing chemical mixture and bioremediation method is disclosed which increases substrate availability in microbial bioremediation and results in increased biodegradation efficiency and completeness while significantly shortening operating time. The mixture contains a surfactant, an emulsifier, an emulsifying solvent, a sequestering agent, and a pH control agent. A preferred mixture also contains a biocatalyst which stimulates the reproductive cycle and rapid multiplication of microbes and thus increases the number of microbes. The mixture emulsifies the oil constituent of contaminants into microscopic oil particles held in suspension in a colloidal state with substantial numbers of the particles being of a size smaller than the microbes that digest it so that indigenous, or hydrocarbon-digesting microbes which may added prior to use, more efficiently digest the contaminants and multiply exponentially and the increased microbe population more rapidly and completely consumes the contaminated substrate. The mixture is also effective in cleaning contaminated surfaces.

21 Claims, No Drawings

5,561,059

SUBSTRATE BIOAVAILABILITY ENHANCING CHEMICAL MIXTURE FOR USE IN BIOREMEDIATION

This application is a continuation, of application Ser. No. 08/018,747, filed Feb. 17 1993, now abandoned.

FIELD OF THE INVENTION

The present invention relates to the bioremediation of hydrocarbon compounds and more particularly, to an emulsifier to be used as an aid thereto, and still more particularly to a substrate bioavailability enhancing chemical mixture that is non-toxic and while acting as a nutrition source, increases substrate bioavailability by emulsifying the oil constituent to microscopic particles smaller than the digesting microbes to establish a more efficient food delivery system for both indigenous microbes and microbes added prior to use so as to enhance the speed and efficiencly of bioremediation.

BACKGROUND OF THE INVENTION

Contamination of the earth's surfaces and subsurfaces with compounds containing hydrocarbons polychlorinated biphenols, and other fats and oils, have long been a problem. There have been many attempts to solve this problem by the use of steam, hot water, or oil dispersing agents. All of these may unduly harm the indigenous flora and fauna that could actually be the greater part of the disposal process in the long term.

Many of the oil dispersing products contain chemicals that kill microbes. While it is true that in small quantities these chemicals may leave some microbes alive, they may also function to destroy most microbes including those that are beneficial.

Moving contaminated materials from one location to another does not eliminate the contamination. Transferring is not transforming. Therefore the hydrocarbon contaminates should be bioremediated insitu thereby limiting transferring toxic residue from one site to another and transferring the liability therewith.

This invention relates to a substrate bioavailability enhancing compound that will emulsify hydrocarbons, clean hydrocarbon contamination, and at the same time act as a nutritional carrier and hydrator for the added specially selected microbes that attach to the microscopic droplets of oil thereby produced, enhancing the digestion process, and inoculating the surface and subsurface for prolonged bioremediation of the contaminates on the surface or that may have penetrated into the substrate. The term bioremediation used herein refers to the use of living microbes to break hydrocarbons into their component parts.

SUMMARY OF THE INVENTION

The invention describes a liquid substrate bioavailability enhancing solution that co-functions as an emulsifier and cleaner for oil contaminated surfaces and subsurfaces, and as an enhancing nutritional liquid carrier for specially selected naturally occurring microbes to be added and indigenous organisms. The added specially selected microbes multiply in the host liquid. After application, to oil contaminated surfaces or subsurfaces as the liquid emulsifies the contaminates, the microbes efficiently begin the digestion of the microscopic particles produced thereby.

The present invention is comprised of two separate parts: the microbe enhancing emulsifier and cleaner, and the selected naturally occurring microbes. The liquid part of the invention is an aqueous mixture of nonionic and anionic surfactants, and other chemicals.

The principal object of this invention is to provide environmental workers with a substrate bioavailability enhancing emulsifier and cleaner for control of hydrocarbon contamination.

Another object of this invention is to provide an efficient to an substrate bioavailability enhancing oil emulsifier and cleaner-carrier for the practical delivery of selected bioremediating microbes.

A further object of this invention is to provide substrate bioavailability enhancing emulsifier-cleaner that, when applied to an oil contaminated surface or substrate, is not detrimental to the indigenous microbial population.

A still further object of this invention is to provide a liquid carrier that acts as a life enhancing medium for the selected naturally occurring microbes that are added prior to application to an oil contaminated surface or substrate biocatalyst.

Another object of this invention is to provide a liquid carrier that acts as a life enhancing medium for the indigenous microbes that are present prior to application to an oil contaminated surface or substrate.

An added object of this invention is to provide a carrier liquid whose components can also act as a food source for the naturally occurring microbes prior to application to an oil contaminated surface of substrate.

An added object of this invention is to provide a carrier liquid whose components can also act as an additional food source for the indigenous microbes.

Another object of this invention is to provide a carrier that stimulates the dormant naturally occurring microbes when added, and provides for their rapid multiplication through the presence of an atomically bonded stable non-oxidizing oxygen biocatalyst added prior to application to the contaminates.

It is a further object of the invention to provide a substrate bioavailability enhancing chemical mixture that may be diluted with water, thus providing an economical method for delivery to, and application upon, contaminated areas.

An additional object of this invention is to provide a carrier for microbes that is not harmful to the intact normal human skin, so that it can be safely handled by the applicators.

A still further object of this invention is to provide a method of practical bioremediation by using emulsifiers that efficiently portion food for the microbes.

Another object of this invention is to provide a method of hydrocarbon cleanup that does not require transportation and relocation of the contaminates which contributes to further pollution of the environment.

A still further object of this invention is to provide a carrier whose active components do not react with each other.

These and other attributes of the invention are realized by the combining into an aqueous base, emulsifiers, surfactants and other ingredients such as the emulsifier nonylphenol ethoxylate, a surfactant such as linear alkyl aryl sodium sulfonate, a sequestering agent such as ethylenedinitrilotetraacedic acid—tetra sodium salt, an emulsifying solvent such as dipropylene glycol monomethyl ether, a pH control agent such as sodium silicate, and an atomically-bonded oxygen-source as part of the water component which serves as a non-oxidizing oxygen biocatalyst.

DETAILED DESCRIPTION OF THE PREFERRED EMBODIMENT

The preferred substrate bioavailiablity enhancing chemical compositions contain the following ingredients mixed in an aqueous base: from 0.04% to 5.0% by total weight of nonylphenol ethoxylate, from 0.05% to 4.0% by total weight of linear alkyl aryl sodium sulfonate, from 0.006% to 3.0% by total weight of ethylenedinitrilotetraacetic acid, tetra sodium salt, from 0.2% to 3.0% by total weight of sodium silicate, and from 0.75% to 4.0% by total weight of dipropylene glycol monomethyl ether. The aqueous base consists of from 1% to 100% of biocatalyst oxygen source. The powdered part of the invention is the dormant live naturally occurring hydrocarbon consuming microbes. A part of the water component consists of atomically bonded oxygen molecules that are non-reactive and non-oxidizing and serves as the non-oxidizing oxygen biocatalyst.

EXAMPLE 1

Into a mixing vat water is added equal to 75.8% of the total mix. Then 4.0% of the nonyphenol ethoxylate is added with continuous gentle agitation. Then 4.23% of linear alkyl aryl sodium sulfonate is added with continuous gentle agitation. Then 1.0% ethylenedinitrilotetraacetic acid is added with continuous gentle agitation. Then 1.52% of sodium silicate is added with continuous gentle agitation. Then 3.45% of dipropylene glycol methyl ether is added with gentle agitation. Then 10% biocatalyst is added and the resultant total mix is continuously mixed for 30 minutes. The total active ingredients of this example is 14.2%.

EXAMPLE 2

Into a mixing vat water is added equal to 49.65% of the total mix. Then add 0.20% nonyphenol ethoxylate is added with continuous gentle mixing. Then 0.21% of linear alkyl aryl sodium sulfonate is added with continuous gentle mixing. Then 0.05% of ethylenedinitrilotetraacetic acid is added with continuous gentle mixing. Then 0.08% of sodium silicate is added with continuous gentle mixing. Then 0.17% of dipropylene glycol methyl ether is added with continuous gentle mixing. Then 49.64% of biocatalyst is added and the resultant total mix is continuously mixed for 30 minutes. The total active ingredients of this example is 0.71%.

EXAMPLE 3

Into a mixing vat water is added equal to 28.92% of the total mix. Then 6.00% nonylphenol ethoxylate is added with continuous gentle mixing. Then 6.12% linear alkyl aryl sodium sulfonate is added with continuous gentle mixing. Then 1.50% ethylenedinitrilotetraacetic acid is added with continuous gentle mixing. Then 2.26% sodium silicate is added with continuous gentle mixing. Then 5.20% dipropylene glycol methyl ether is added with continuous gentle mixing. Then 50.00% biocatalyst is added and the resultant total mix is mixed gently for 30 minutes. The total active ingredients of this example is 21.08%.

EXAMPLE 4

Into a mixing vat water is added equal to 19.59% of the total mix. Then 9.00% nonylphenol ethoxylate is added with continuous gentle mixing. Then 8.06% of linear alkyl aryl sodium sulfonate is added with continuous gentle mixing. Then 2.25% ethylenedinitrilotetraacetic acid is added with continuous gentle mixing. Then 3.40% sodium silicate is added with continuous gentle mixing. Then 7.70% dipropylene glycol methyl ether is added with gentle mixing. Then 50.00% biocatalyst is added and the resultant total mix is mixed gently for 30 minutes. The total active ingredients of this example is 30.41%.

The resultant substrate bioavailabilty enhancing liquid emulsifier for waste oil is completely biodegradable and nontoxic. It will be noted that the examples indicate that the resultant substrate emulsifier may be made in a dilute form or in a concentrated form that allows for economical job site diluting with either water or biocatalyst as a diluent.

A mixture according to the above described examples, but without the biocatalyst, may be mixed with hydrocarbon containing contaminates such as polychlorinated biphenols under anaerobic conditions for enhanced bioremediation of the contaminates.

It has been demonstrated that when applied to heavily contaminated surfaces the substrate bioavailability enhancing emulsifier is efficient in concentrations of 2 parts oil to 1 part emulsifier by forming an efficient water-in-oil emulsion and as more water is added the emulsion is reversed and an oil-in-water emulsion is formed. This has the added benefit of encapsulating the microscopic particles of contaminates and not allowing them to recontaminate the surface. This encapsulation also provides the added safety feature of significantly raising the flash point of certain high flash contaminates. The raising the flash point of flammable contaminates is an important safety factor in dealing in any realm but especially in the bilges of boats and hips as well as in large waste water containers and basins.

In the preferred embodiment, selected live naturally occurring microbes are added to the liquid emulsifier at the job site prior to use. The microbes may be anaerobic microbes, aerobic microbes, or facultative microbes which are added under anaerobic or aerobic conditions. The microbes may be dormant live naturally occurring microbes packaged in powder form.

The liquid substrate bioavailability enhancing emulsifier of the present invention, when the dormant dry powder microbes are added, acts as a host liquid for the microbes and with the action of the biocatalyst causes the microbes to be activated and nourished to activate their reproduction cycle.

The combination of ingredients stimulates a very rapid arousal of the microbes from their dormant state, activating their rapid division so that when the liquid mixture is applied, the microbes are vigorous and reproducing exponentially.

The substrate bioavailability enhancing chemical mixture is applied to oil contaminated surfaces and upon contact with the hydrocarbons, the mixture of ingredients rapidly emulsifies the oil contaminates into tiny droplets. Just as milk fat (oil) is in a near colloid state in milk and thus does not easily rise to the surface as cream, the emulsifiers decrease the size of the contaminating oil and hold it in suspension because of the tiny droplet sizes. This exposes tremendous surface area to the activated oil-consuming microbes which can then efficiently begin bioremediation.

Microbes can most efficiently biodegrade their food substrate if it is available in sizes smaller than themselves.

The encapsulation of the microscopic particles of oil in the resultant colloid state gives the microbes the important oil/water interface that is necessary, along with supplemental oxygen, for their efficient oil-digesting activities.

It can be seen from the forgoing, and the examples, that a new and novel substrate bioavailability enhancing emulsifying mixture for cleaning and the practical and effective deliverance of microbes, is demonstrated by the present invention.

While the preferred embodiment of the invention has been described, modifications thereof can be made by one skilled in the art without departing from the spirit of the invention.

What is claimed is:

1. A biodegradable and nontoxic substrate bioavailability enhancing chemical mixture to be applied to contaminants and pollutants containing hydrocarbons, polychlorinated biphenols, and other fats and oils, in the presence of hydrocarbon-digesting microbes, to increase the speed and efficiency of microbial bioremediation of the contaminants and pollutants, said mixture comprising:

a surfactant, an emulsifier, an emulsifying solvent, and a sequestering agent in an effective amount to rapidly emulsify the oil constituent of said contaminants and pollutants into microscopic oil particles held in suspension in a colloidal state with substantial numbers of said particles being of a size smaller than said hydrocarbon-digesting microbes and serve as a nutrient therefor; and a pH control agent in an effective amount to facilitate growth of said hydrocarbon-digesting microbes; whereby said bioavailability enhancing chemical mixture increases the speed and efficiency of bioremediation by breaking the available nutrient contaminate substrate into microscopic oil particles smaller than said hydrocarbon-digesting microbes for more efficient digestion thereby.

2. The biodegradable and nontoxic substrate bioavailability enhancing chemical mixture according to claim 1 including:

a quantity of hydrocarbon-digesting microbes in an amount sufficient to inoculate said mixture; and a biocatalyst, in an effective amount to stimulate the reproductive cycle and rapid multiplication of indigenous microbes and said hydrocarbon-digesting microbes;

said bioavailability enhancing chemical mixture serving as a nutrient carrier and stimulant for activating both said indigenous microbes and said hydrocarbon-digesting microbes; whereby said bioavailability enhancing chemical mixture increases the speed and efficiency of bioremediation by increasing the number of said indigenous microbes and said hydrocarbon-digesting microbes and breaking the available nutrient contaminate substrate into microscopic particles smaller than said indigenous microbes and said hydrocarbon-digesting microbes for more efficient digestion by the increasing microbe population.

3. A biodegradable and nontoxic substrate bioavailability enhancing chemical mixture for use in bioremediation of contaminants and pollutants containing hydrocarbons, polychlorinated biphenols, and other fats and oils, comprising an aqueous mixture of:

from about 0.20% to about 10.0% by total weight of an emulsifier;

from about 0.21% to about 9.0% by total weight of a surfactant;

from about 0.05% to about 3.0% by total weight of a sequestering agent;

from about 0.08% to about 3.5% by total weight of a pH control agent;

from about 0.17% to about 8.0% by total weight of an emulsifying solvent;

from about 10.0% to about 70.0% by total weight of a biocatalyst capable of stimulating the reproductive cycle and multiplication of microbes; and a quantity of hydrocarbon-digesting microbes selected from the group consisting of live naturally-occurring microbes, anaerobic microbes, aerobic microbes, and facultative microbes in an amount sufficient to inoculate said mixture, said hydrocarbon-digesting microbes added to the recited ingredients after mixing and prior to applying said aqueous mixture to said contaminants and pollutants;

said aqueous mixture, upon contact with said contaminants and pollutants, rapidly emulsifying the oil constituent into microscopic oil particles held in suspension in a colloidal state with substantial numbers of said particles being of a size smaller than said hydrocarbon-digesting microbes and serving as a nutrient therefor; and the combination of recited ingredients activating both indigenous microbes and said hydrocarbon-digesting microbes and causing stimulation of their reproductive cycle and rapid multiplication thereof; whereby said aqueous mixture increases the speed and efficiency of bioremediation by increasing the number of indigenous microbes and said hydrocarbon-digesting microbes and breaking the available nutrient contaminate substrate into microscopic particles smaller than said indigenous microbes and said hydrocarbon-digesting microbes for more efficient digestion by the increasing microbe population.

4. The biodegradable and nontoxic substrate bioavailability enhancing chemical mixture according to claim 3 wherein said emulsifier is nonylphenol ethoxylate.

5. The biodegradable and nontoxic substrate bioavailability enhancing chemical mixture according to claim 3 wherein said surfactant is linear alkyl aryl sodium sulfate.

6. The biodegradable and nontoxic substrate bioavailability enhancing chemical mixture according to claim 3 wherein said sequestering agent is ethylenedinitrilotetraacetic acid.

7. The biodegradable and nontoxic substrate bioavailability enhancing chemical mixture according to claim 3 wherein said pH control agent is sodium silicate.

8. The biodegradable and nontoxic substrate bioavailability enhancing chemical mixture according to claim 3 wherein said emulsifying solvent is dipropylene glycol methyl ether.

9. The biodegradable and nontoxic substrate bioavailability enhancing chemical mixture according to claim 3 wherein said biocatalyst is a stable atomically-bonded non-oxidizing oxygen catalyst in a water base.

10. A high efficiency method of nontoxic microbial bioremediation of contaminants and pollutants containing hydrocarbons, polychlorinated biphenols, and other fats and oils, which comprises:

providing an aqueous emulsifying mixture containing a surfactant, an emulsifier, an emulsifying solvent, and a sequestering agent in an effective amount to rapidly emulsify the oil constituent of said contaminants and pollutants into microscopic oil particles held in suspension in a colloidal state with substantial numbers of said particles being of a size smaller than hydrocarbon-digesting microbes, a pH control agent in an effective amount to facilitate growth of microbes, and a biocatalyst in an effective amount to stimulate the reproductive cycle and multiplication of microbes;

applying said aqueous emulsifying mixture to said contaminants and pollutants in the presence of hydrocarbon-digesting microbes, in an effective amount to rapidly emulsify the oil constituent of said contaminants and pollutants into microscopic oil particles held in suspension in a colloidal state with substantial numbers of said particles being of a size smaller than said hydrocarbon-digesting microbes to serve as a nutrient therefor; and said aqueous emulsifying mixture activating said hydrocarbon-digesting microbes and causing stimulation of their reproductive cycle and rapid multiplication thereof; whereby said aqueous emulsifying mixture increases the speed and efficiency of bioremediation by incresing the number of said hydrocarbon-digesting microbes and breaking the available nutrient contaminate substrate into microscopic particles smaller than said hydrocarbon-digesting microbes for more efficient digestion by the increasing microbe population.

11. A high efficiency method of nontoxic microbial bioremediation of contaminants and pollutants containing hydrocarbons, polychlorinated biphenols, and other fats and oils, which comprises:

providing an aqueous mixture which includes an emulsifier, an emulsifying solvent, a surfactant, and a sequestering agent in an effective amount to rapidly emulsify the oil constituent of said contaminants and pollutants into microscopic oil particles held in suspension in a colloidal state with substantial numbers of said particles being of a size smaller than hydrocarbon-digesting microbes, a pH control agent in an effective amount to facilitate growth of microbes, and a biocatalyst in an effective amount to stimulate the reproductive cycle and multiplication of microbes;

adding a quantity of hydrocarbon-digesting microbes selected from the group consisting of live naturally-occurring microbes, anaerobic microbes, aerobic microbes, and facultative microbes to said aqueous mixture in an amount sufficient to inoculate said mixture;

applying said aqueous mixture containing said hydrocarbon-digesting microbes to said contaminants and pollutants in an effective amount to rapidly emulsify the oil constituent of said contaminants and pollutants into said microscopic oil particles; and said aqueous mixture activating both indigenous microbes and said hydrocarbon-digesting microbes and causing stimulation of their reproductive cycle and rapid multiplication thereof; whereby said aqueous mixture increases the speed and efficiency of bioremediation by increasing the number of said indigenous microbes and said hydrocarbon-digesting microbes and breaking the available nutrient contaminate substrate into microscopic particles smaller than said indigenous microbes and said hydrocarbon-digesting microbes for more efficient digestion by the increasing microbe population.

12. The method according to claim 11 wherein said emulsifier is nonylphenol ethoxylate.

13. The method according to claim 11 wherein said surfactant is linear alkyl aryl sodium sulfate.

14. The method according to claim 11 wherein said sequestering agent is ethylenedinitrilotetraacetic acid.

15. The method according to claim 11 wherein said pH control agent is sodium silicate.

16. The method according to claim 11 wherein said emulsifying solvent is dipropylene glycol methyl ether.

17. The method according to claim 11 wherein said biocatalyst is a stable atomically-bonded non-oxidizing oxygen catalyst.

18. The method according to claim 11 wherein said biocatalyst is a stable atomically-bonded non-oxidizing oxygen catalyst in a water base.

19. A process for making a biodegradable and nontoxic substrate bioavailability enhancing chemical mixture and microbial nutrient carrier for use in bioremediation of contaminants and pollutants containing hydrocarbons, polychlorinated biphenols, and other fats and oils, comprising the steps of:

introducing water in the amount of from about 20% to about 75% by total weight into a mixing vat and during gentle agitation, slowly adding the following ingredients:

from about 0 20% to about 9.0% by total weight of an emulsifier;

from about 0.21% to about 9.0% by total weight of a surfactant;

from about 0.05% to about 3.0% by total weight of a sequestering agent;

from about 0.08% to about 3.5% by total weight of a pH control agent;

from about 0.17% to about 8.0% by total weight of an emulsifying solvent;

from about 10.0% to about 50.0% by total weight of a biocatalyst capable of stimulating the reproductive cycle and multiplication of micobes; and after the addition of the final ingredient, mixing the recited ingredients for a minimum of 30 minutes.

20. The process according to claim 19 including the further step of:

after mixing said ingredients, and prior to application of said mixture to a substrate to be treated, adding a quantity of hydrocarbon-digesting microbes selected from the group consisting of live naturally- occurring microbes, anaerobic microbes, aerobic microbes, and facultative microbes.

21. The process according to claim 19 wherein:

said emulsifier is nonylphenol ethoxylate;

said surfactant is linear alkyl aryl sodium sulfate;

said sequestering agent is ethylenedinitrilotetraacetic acid;

said pH control agent is sodium silicate;

said emulsifying solvent is dipropylene glycol methyl ether; and said biocatalyst is a stable atomically-bonded non-oxidizing oxygen catalyst.

* * * * *